Dec. 29, 1925.  1,567,224
A. J. BAAGØE
WEIGHING IMPLEMENT THE DEFLECTION OF WHICH IS
MADE VISIBLE OR ENLARGED BY OPTICAL MEANS
Filed March 25, 1924
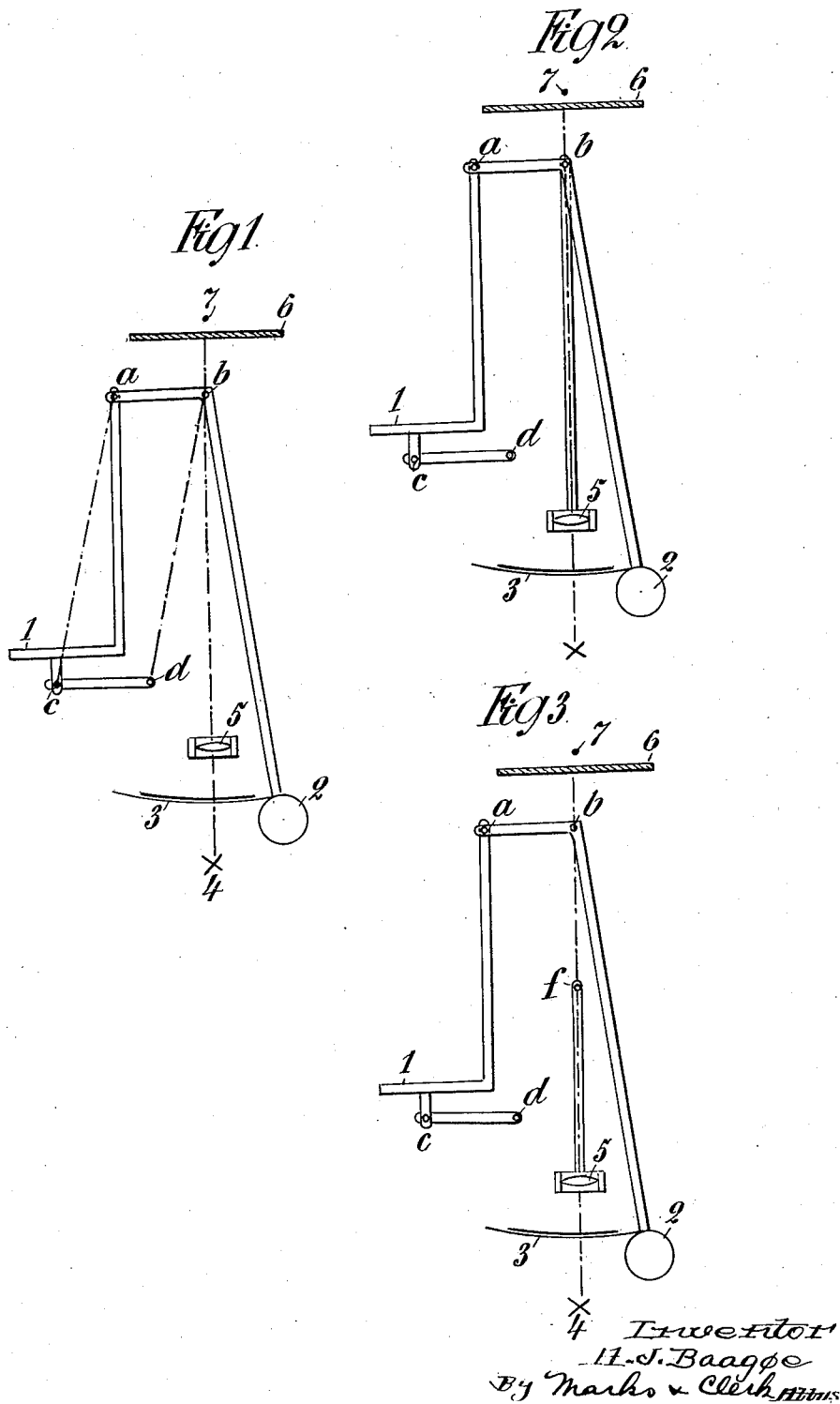

Patented Dec. 29, 1925.

1,567,224

UNITED STATES PATENT OFFICE.

ANTHON JOHANNES BAAGØE, OF COPENHAGEN, DENMARK, ASSIGNOR TO AKTIE-SELSKABET NIELSEN & WINTHER, OF COPENHAGEN, DENMARK.

WEIGHING IMPLEMENT THE DEFLECTION OF WHICH IS MADE VISIBLE OR ENLARGED BY OPTICAL MEANS.

Application filed March 25, 1924. Serial No. 701,862.

*To all whom it may concern:*

Be it known that I, ANTHON JOHANNES BAAGØE, a citizen of the Kingdom of Denmark, and residing at Copenhagen, Denmark, have invented certain new and useful improvements in and relating to weighing implements the deflection of which is made visible or enlarged by optical means, of which the following is a specification.

In weighing implements or machines directly showing the weight (e. g. spring balances, pendulum balances) it is in most cases necessary to multiply the oscillation or deflection of the balance by means of gear wheels or the like in order to make the movement sufficiently large to secure an easy reading.

This multiplication increases, however, highly the friction and the inertia of the weighing mechanism so that its sensibility is essentially diminished.

Balances have, therefore, been constructed in which the multiplication takes places optically, a system of lenses, concave mirrors or the like forming a lanternpicture of a scale which is in connection with the movable parts of the balance, and the indications of the balance are then read on this image.

This method of reading has, however, the inconvenience that a small alteration of the base on which the balance stands leads to a corresponding small alteration of the oscillation of the balance and as this error is multiplied by the optical device the precision of the weighing apparatus becomes illusory.

The present invention relates to a device which makes the weighing totally or partly independent of movements of the base of the balance and this is obtained chiefly thereby that the optical system or parts thereof are so mounted that said system or parts is or are movable relatively to both the weighing mechanism and the stationary parts of the machine.

Fig. 1 of the drawing shows schematically one of the hitherto known devices for optically enlarging the oscillations of a sinue balance. 1 is the platform upon which the load to be weighed is laid.

As the points $b$ and $d$ are stationary and the connecting lines of the points $a$, $b$, $c$, $d$ form a parallelogram, the parallel motion of the platform is obtained, and to a certain load a certain oscillation of the pendulum 2 will always correspond.

With the pendulum 2 is combined a transparent scale 3 illuminated by a light source 4 e. g. an electric lamp. Hereby a lantern-picture is formed on a screen (ground glass or the like) 6 by means of a lens 5, so that the oscillation of the weight may be read by an index 7 placed on or at 6.

According to the present invention the optical system or a portion thereof—in this case the lens 5 is movably mounted.

Fig. 2 shows a constructional form of this arrangement. The lens 5 is suspended at the point $b$ so that an alteration of the position of the base influences the pendulum 2 and lens 5 equally, whereby the lanternpicture on the screen 6 will be practically unaltered. Theoretically the error will only be eliminated when the point $b$ lies in the plane of the screen 6 or when the index 7 is rigidly connected with the suspension of the lens 5.

If the lens 5 is not suspended at the point $b$ but at another point, a suitable choice of this point will enable the effect of a certain alteration of the base upon the indications of the balance to be varied at will. Such a constructional form is shown schematically in Fig. 3 where the lens 5 is suspended at a point $f$ different from the point $b$.

The suspension or mounting of the lens system so as to obtain the necessary mobility may be carried out in many various ways. For instance it may be suspended by edges in suitable bearings, by movable ribbons or on thin shafts or taps. The various suspending means may be fixed either to the stationary parts of the balance or to the movable parts of the weighing mechanism.

The illustrated constructional forms are, of course, taken only by way as examples and the invention may be performed in several other ways. For instance other parts of the optical system than the part 5 may be movable and the mobility may be obtained in other ways than the shown suspension. Also the invention may be used in connection with other balances than the pendulum balance shown here.

I claim:

1. In a scale, in combination, a stationary part, a weighing mechanism, and optical means including a part and means for movably suspending said part of the optical means so that it is responsive to gravity and moves relatively both with respect to the weighing mechanism and stationary part of the scale.

2. In a scale in combination a stationary part, weighing mechanism, a pendulum provided with an indicator for coacting with the stationary part, and an optical system including a gravity controlled and movably suspended lens the axis of oscillation of which is parallel to the oscillation of the pendulum.

In testimony whereof I affix my signature.

ANTHON JOHANNES BAAGØE.